Oct. 26, 1943.           J. A. LIGNIAN            2,332,733
               METHOD OF MAKING POROUS METAL
                    Filed March 27, 1940

INVENTOR
Jean A. Lignian
BY
 Spencer Hardman & John
  his ATTORNEYS

Patented Oct. 26, 1943

2,332,733

UNITED STATES PATENT OFFICE 2,332,733

METHOD OF MAKING POROUS METAL

Jean A. Lignian, Dayton, Ohio, assignor to General Motors Corporation, Detroit, Mich., a corporation of Delaware Application March 27, 1940, Serial No. 326,221

2 Claims. (Cl. 29—149.5)

This invention relates to the manufacture of bearings and is particularly concerned with manufacturing steps which permit the bearing to function under extreme load conditions.

An object of the invention is to provide a composite metal bearing which includes an impregnated porous matrix bonded to a steel back, wherein the porous metal matrix has a degree of compressibility remaining therein which is only apparent under extreme working load conditions and which matrix is sufficiently strong to be substantially incompressible under normal working load conditions.

A further object of the invention is to provide a method for making a bearing of the class described which includes the step of sizing the porous metal layer thereon prior to impregnation thereof at pressures less than extreme load conditions but at sufficiently high pressures to provide a strong matrix which will not yield appreciably under normal working load conditions.

Further objects and advantages of the present invention will be apparent from the following description, reference being had to the accompanying drawing wherein a preferred embodiment of the present invention is clearly shown.

Figure 1:
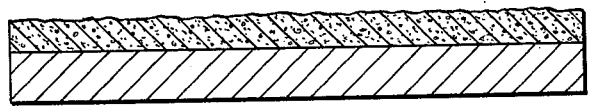
Fig. 1 shows a bearing blank having an unsized, sintered metal matrix thereon.
Figure 2:
Fig. 2 shows the same blank after sizing the metal matrix.
Figure 3:
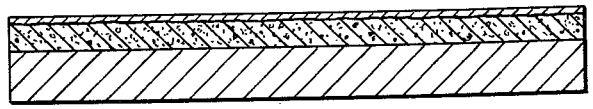
Fig. 3 shows the same blank after impregnation of the sized porous metal matrix with a bearing babbitt, said babbitt forming an overlay on the porous metal layer.

In application Ser. No. 85,297, assigned to assignee of the present invention, a method is set forth which may be used for making bearings that include a porous metal layer bonded to a steel back which porous metal layer may be impregnated with a soft bearing metal. Bearings of this type have proven very satisfactory since the use of a porous metal intermediate layer provides a mechanical interlocking bond between the babbitt and the steel, as well as chemical. In some cases the babbitt is impregnated into the porous metal and in some cases, as disclosed in application Serial No. 169,411, assigned to assignee of the present invention, the babbitt also forms an overlay on top of the porous metal layer. In this case, it is particularly desirable to machine off the babbitt layer so that from .002 to .005 of the metal remains over the highest point of the porous metal layer. This overlay is an effective bearing material and due to its thinness it is very suitable for extreme load conditions and similarly due to the improved bond as provided by the porous metal matrix between the babbitt and the steel the longevity of the bearing is increased.

In the past bearing failure has been caused mainly by the failure of the bond between the babbitt and the steel. It has been proposed to reduce the thickness of the babbitt and such a proposal also improves the life of the bearing. However, bearing failure still occurs due to failure of the bond between the babbitt and the steel. In the present instance, the porous metal layer is metallurgically bonded to the steel and then, due to the porosity of the layer, the babbitt which is impregnated therein is bonded metallurgically to the porous metal layer but likewise is held mechanically to the porous metal layer by interlocking of the babbitt within the tortuous pores of the matrix.

It has been found that in thick babbitt bearings, under extreme load conditions, that the babbitt deforms and does not have sufficient strength. It is for this reason, that composite bearings as described hereinbefore wherein a strong metal matrix is provided, produce bearings whose life and operating characteristics are unexcelled. Under extreme working load conditions it is desirable to have some compressibility remaining in a bearing. Thus while a bearing is operating under or slightly above normal load the bearing is substantially incompressible, but when an extreme load is imposed thereon it is very desirable to have a bearing that "will give," that is, have some compressibility therein which will prevent bearing failure due to extreme load, or to have so-called "conformability." I have found that the conform factor may be incorporated in a composite bearing which includes a porous metal layer therein by means of suitable choice of sizing pressures utilized prior to impregnation of the porous metal. In other words, in the applications heretofore mentioned, it is proposed that the porous metal matrix bonded to steel be run through sizing rolls for compressing the matrix and making the same of a uniform thickness. This compression step besides making the porous metal layer of uniform thickness increases the strength due to the increase in density. After the sizing step the usual practice is to impregnate the matrix with babbitt. In my improved method of manufacture I propose to size the porous metal matrix under pressures less than the extreme load pressures encountered in engines or other installations but at pressures greater than normal load condition pressures whereby the bearing will be substantially incompressible during normal operation in the engine or the like but under extreme loads will give or compress sufficiently to prevent bearing failure. Such a give may only amount to in the neighborhood of a few tenths of a thousandth, but this is sufficient to prevent complete failure of the bearing.

In bearings, such as are used in automobile connecting rods, it has been found that normal working load range is between 500 to 2000 pounds per square inch whereas under extreme load conditions the pressures imposed upon the bearings may amount to as much as 3000 to 5000 pounds per square inch. I, therefore, propose to size the porous matrix under a pressure of 3000 pounds per square inch for connecting rod bearings. While the example given is illustrative of only one type of bearing, it is apparent that in any other bearing a similar procedure may be followed by choosing a sizing pressure intermediate the average normal working pressure and the extreme load pressure on the bearing.

It is apparent that when knowing the particular installation for which the bearing is to be used and after determining the loads imposed thereon that a proper choice of sizing pressures may be arrived at and such choice necessarily must vary with the exact application of the bearing.

While the embodiments of the present invention as herein disclosed, constitute a preferred form, it is to be understood that other forms might be adopted, all coming within the scope of the claims which follow.

What is claimed is as follows:

1. The method of making a bearing for use at a predetermined normal operating pressure and an extreme operating pressure substantially above said normal operating pressure, comprising: providing a porous metal bearing blank by sintering together metal powder, compressing said porous metal blank at a pressure appreciably greater than said normal operating pressure and appreciably less than said extreme operating pressure, and then impregnating said thus-compressed porous metal blank with a suitable bearing metal.

2. The method of making a bearing for use at a predetermined normal operating pressure and an extreme operating pressure substantially above said normal operating pressure, comprising: providing a porous metal bearing blank by sintering together metal powder, compressing said porous metal blank at a pressure substantially midway between said normal operating pressure and said extreme operating pressure, and then impregnating said thus-compressed porous metal blank with a suitable bearing metal.

JEAN A. LIGNIAN.